W. H. Seymour.
Harvester Cutter.

No. 16,253.  Patented Dec. 16, 1856.

UNITED STATES PATENT OFFICE.

WILLIAM H. SEYMOUR, OF BROCKPORT, NEW YORK, ASSIGNOR TO SEYMOUR & MORGAN, OF SAME PLACE.

IMPROVED FINGER-BAR FOR HARVESTING-MACHINES.

Specification forming part of Letters Patent No. 16,253, dated December 16, 1856.

*To all whom it may concern:*

Be it known that I, WILLIAM H. SEYMOUR, of Brockport, in the county of Monroe and State of New York, have invented a new and useful Improvement in the Mode of Constructing Finger-Bars for Harvesting-Machines; and I do hereby declare the following to be a full, clear, and exact description of the same, reference being had to the accompanying drawings, which make part of this specification, and in which—

Figure 1:
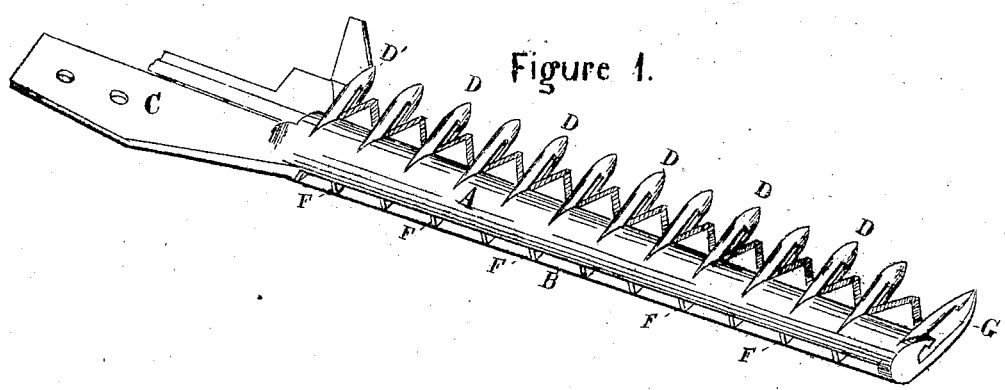
Figure 2:
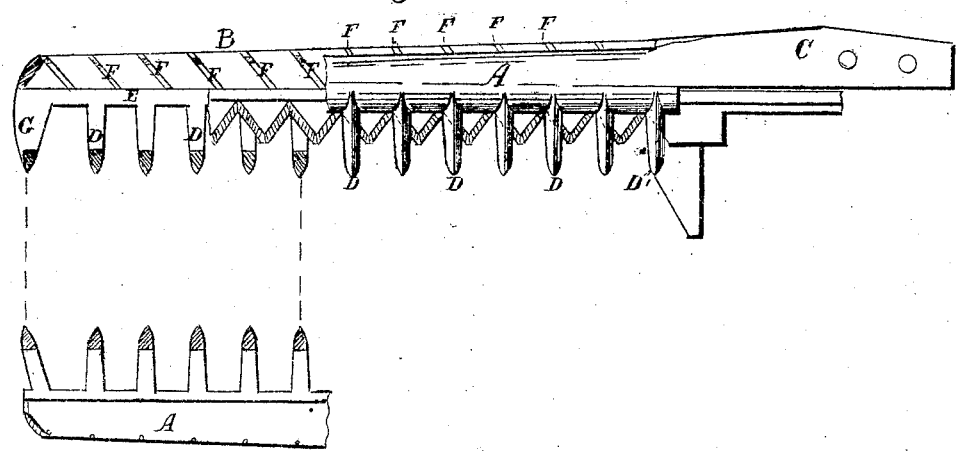
Figure 3:
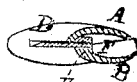
Figure 4:
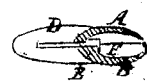
Figure 5:
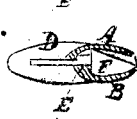
Figure 6:
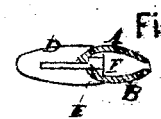

Figure 1 represents a perspective view of a finger-bar constructed according to my improved plan. Fig. 2 represents a plan of the same with a portion of its top removed in order to show the interior arrangement of the parts. Figs. 3, 4, 5, and 6 represent cross-sections of the bar, showing different arrangements of the interior parts.

My invention consists, first, in casting a hollow finger-bar consisting of an upper and an under plate with spaces between them, and a series of double guard-fingers, all in one piece; second, in making the finger-bar hollow with openings in the back, in combination with the inclined ribs for the discharge of grass or other substances which enter during the operation of the cutter; third, in arranging within the bar behind the cutters a series of inclined ribs to strengthen the bar, detach wire-grass or other obstructions from the cutters, and by their inclination to the line of motion of the cutters to assist in discharging these obstructions through the openings in the back of the bar.

The guard-fingers in harvesting-machines are usually made of either wrought or cast iron, and are attached by their shanks to the bar by driving them into it, or by bolts or rivets.

In that class of machines which have a sheath for the cutter the shank of each finger is usually made with two flat plates, one being an extension of the upper and the other of the lower prong. These plates respectively form the top and bottom of the sheath, and are attached near their rear edges by bolts or rivets to the bar. In these machines great difficulty is experienced from grass or other substances being drawn into the sheath and clogging the cutters, there being no device provided for relieving the cutters from these obstructions. The object of this improved finger-bar is to avoid these defects, and to combine stiffness, strength, and durability with cheapness of construction. Although this finger-bar, with the guard-fingers, divider, and shoe, is molded in the usual manner of hollow castings with a core to form the interior, and is cast in one piece, yet its parts will be described separately.

The two longitudinal plates A and B are both curved in their cross-section and united at each end with their convex surfaces outward. These plates form a case or sheath, open on the front and back. United to one end of this case is a flat plate, C, by which the bar is attached to the machine. Guard-fingers D project from the front of the case at regular intervals and have slots made in the usual manner for the cutter to play in. The top and bottom of the fingers unite with the upper and under plates and leave an opening in the front of the sheath for the cutter to play through. The upper plate, A, projects in front beyond the lower for the purpose of preventing the entrance of sand and other obstructions into the sheath. The lower plate, B, is formed with a rest, E, for the cutter-stock. A series of ribs, F, are attached to the lower plate and extend from the back of the rest E to the back of the bar in a direction inclined to the line of motion of the cutter. At the back of the rest E they may connect both plates and be disconnected from the upper plate at the back of the bar, (see Fig. 5;) or both plates may be connected through the entire length of the rib, (see Fig. 6;) or they may at the back of the rest rise only as high as the top of the cutter-stock and connect both plates at the back of the bar. (See Figs. 3 and 4.) These ribs leave the opening in the back of the bar unbroken, or form a series of short openings as they are connected to or disconnected from the plates at the back; but for the purpose of giving great strength I in general prefer to connect the ribs with both plates.

That part of the upper plate, A, which projects beyond the lower forms the top of the sheath and also the front guide for the cutter-stock. That part of the lower plate which projects in front of the ribs forms the bottom of the sheath and also the rest E for the cutter-stock. The front ends of the ribs F make the back guide for the stock. The cutter-stock should play freely in the sheath. The finger G at the outer end of the bar is wider than the others, is inclined toward the end of the bar, and forms a divider. To the finger D' at the inner end of the bar a shoe is attached, which tends to prevent the guard-fingers from plowing into uneven ground, and raises and turns within the range of the cutter the stalks of grain that overhang the stubble. The ribs stiffen and strengthen the bar, serve to guide the cutter, act as scrapers to remove the grass and other obstructions that accumulate upon the cutter during the operation of the machine, and also assists by their inclination to the line of motion of the cutter in discharging these obstructions from the bar. The friction of the cutter while in motion against the substances scraped from it moves these substances back and forth in the spaces or channels between the ribs. When moved in one direction they meet the side of a rib at an acute angle and are compressed together. When moved in the opposite direction they meet the side of the adjacent rib at an obtuse angle, slide against it into the channel, and are thus detached from the cutter and carried toward the back of the bar. The successive vibrations of the cutter detach from its back the obstructing substances and force them into the channels between the ribs, each portion pressing back those which precede it until they are discharged through the back of the bar.

I do not confine myself to the form of finger-bar I have described, for so long as it is made hollow it may be varied in shape and proportions without any departure from the principle of my invention.

What I claim as my invention, and desire to secure by Letters Patent, is—

1. Casting the finger-bar composed of an upper and an under plate united by the guard-fingers all in one piece, substantially as described.

2. The openings in the back of the hollow finger-bar, in combination with the inclined ribs, for the purpose and in the manner herein described.

3. Ribs or partitions constructed and arranged substantially as described.

In testimony whereof I have hereunto subscribed my name.

WM. H. SEYMOUR.

In presence of—
GEO. H. ALLEN,
HENRY W. SEYMOUR.